United States Patent
Lala et al.

(10) Patent No.: US 7,139,793 B2
(45) Date of Patent: Nov. 21, 2006

(54) METHOD FOR CONVENIENTLY ENABLING A WEB SERVER TO PROVIDE COMMERCIAL PROMOTIONS USING COMPILED CODE

(75) Inventors: Ravesh Lala, Roswell, GA (US); Matthew Bunkley Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 931 days.

(21) Appl. No.: 09/846,311

(22) Filed: May 1, 2001

(65) Prior Publication Data

US 2002/0165908 A1 Nov. 7, 2002

(51) Int. Cl.
*G06F 15/16* (2006.01)

(52) U.S. Cl. .................. 709/203; 709/201; 705/14
(58) Field of Classification Search .............. 709/203, 709/224, 201, 219, 221, 204; 705/10, 14, 705/5, 26, 37, 50; 483/1, 41; 382/100, 185; 707/2, 5, 10, 100, 103; 463/16; 715/700, 715/866
See application file for complete search history.

(56) References Cited

U.S. PATENT DOCUMENTS

| | | | | |
|---|---|---|---|---|
| 5,446,890 A | | 8/1995 | Renslo et al. ............... 395/600 |
| 5,586,198 A | * | 12/1996 | Lakritz ........................ 382/185 |
| 5,592,560 A | * | 1/1997 | Deaton et al. .............. 382/100 |
| 5,644,723 A | | 7/1997 | Deaton et al. .............. 395/214 |
| 5,675,784 A | * | 10/1997 | Maxwell et al. ............ 707/100 |
| 5,761,647 A | * | 6/1998 | Boushy ....................... 705/10 |
| 5,791,991 A | * | 8/1998 | Small .......................... 463/41 |
| 5,857,175 A | * | 1/1999 | Day et al. .................... 705/14 |
| 5,905,246 A | * | 5/1999 | Fajkowski ................... 235/375 |
| 5,907,839 A | * | 5/1999 | Roth ............................. 707/5 |
| 5,915,243 A | | 6/1999 | Smolen ...................... 705/14 |
| 5,918,211 A | | 6/1999 | Sloane ........................ 705/16 |
| 5,918,232 A | * | 6/1999 | Pouschine et al. ...... 707/103 R |
| 5,950,173 A | | 9/1999 | Perkowski ................... 705/26 |
| 5,963,952 A | | 10/1999 | Smith ........................ 707/102 |
| 6,009,411 A | | 12/1999 | Kepecs ....................... 705/14 |
| 6,026,370 A | * | 2/2000 | Jermyn ....................... 705/14 |
| 6,061,660 A | * | 5/2000 | Eggleston et al. .......... 705/143 |
| 6,085,171 A | * | 7/2000 | Leonard ..................... 705/26 |
| 6,105,001 A | * | 8/2000 | Masi et al. .................. 705/14 |
| 6,189,003 B1 | * | 2/2001 | Leal ............................. 707/2 |
| 6,230,143 B1 | * | 5/2001 | Simons et al. .............. 705/14 |
| 6,256,614 B1 | * | 7/2001 | Wecker et al. .............. 705/14 |
| 6,293,865 B1 | * | 9/2001 | Kelly et al. .................. 463/16 |
| 6,330,543 B1 | * | 12/2001 | Kepecs ....................... 705/14 |
| 6,484,149 B1 | * | 11/2002 | Jammes et al. ............. 705/26 |
| 6,502,076 B1 | * | 12/2002 | Smith ......................... 705/14 |

(Continued)

OTHER PUBLICATIONS

Intelligent Interactive Information Presentation—For Cultural Tourism ; peach.itc.it/papers/i3pCultureTour.pdf.*

(Continued)

*Primary Examiner*—Thung Vu
(74) *Attorney, Agent, or Firm*—John R. Pivnichny

(57) ABSTRACT

An improved method for enabling an electronic commerce web server to provide commercial promotions. Modules of selectively executable compiled web server code are included within the web server's larger body of compiled code. A database contains the terms of each promotion and an association of each promotion with one of the modules. When a commercial transaction arrives at the server, the transaction is checked for a qualifying value that matches one of the qualifying values of the promotions in the database. When a match is found, the associated module of selectively executable compiled web server code is executed, thereby providing the promotion.

22 Claims, 3 Drawing Sheets

U.S. PATENT DOCUMENTS

| | | | |
|---|---|---|---|
| 6,516,302 B1* | 2/2003 | Deaton et al. | 705/14 |
| 6,651,093 B1* | 11/2003 | Wiedeman et al. | 709/221 |
| 6,659,861 B1* | 12/2003 | Faris et al. | 463/1 |
| 6,687,679 B1* | 2/2004 | Van Luchene et al. | 705/14 |
| 6,687,698 B1* | 2/2004 | Nixon et al. | 707/10 |
| 6,735,572 B1* | 5/2004 | Landesmann | 705/14 |
| 6,748,365 B1* | 6/2004 | Quinlan et al. | 705/14 |
| 6,915,271 B1* | 7/2005 | Meyer et al. | 705/14 |
| 6,980,962 B1* | 12/2005 | Arganbright et al. | 705/26 |
| 7,003,495 B1* | 2/2006 | Burger et al. | 705/50 |
| 7,013,289 B1* | 3/2006 | Horn et al. | 705/26 |
| 2001/0014868 A1* | 8/2001 | Herz et al. | 705/14 |
| 2001/0037250 A1* | 11/2001 | Lefkowitz | 705/26 |
| 2001/0051983 A1* | 12/2001 | Williams | 709/204 |
| 2002/0004764 A1* | 1/2002 | Stolze et al. | 705/27 |
| 2002/0016737 A1* | 2/2002 | Izzo et al. | 705/14 |
| 2002/0040308 A1* | 4/2002 | Hasegawa et al. | 705/5 |
| 2002/0046089 A1* | 4/2002 | Zorn | 705/14 |
| 2002/0046157 A1* | 4/2002 | Solomon | 705/37 |
| 2002/0055880 A1* | 5/2002 | Unold et al. | 705/26 |
| 2002/0062249 A1* | 5/2002 | Iannacci | 705/14 |
| 2002/0095346 A1* | 7/2002 | Liss | 705/26 |
| 2002/0099607 A1* | 7/2002 | Sosa et al. | 705/14 |
| 2002/0107738 A1* | 8/2002 | Beach et al. | 705/14 |
| 2002/0124057 A1* | 9/2002 | Besprosvan | 709/219 |
| 2002/0156688 A1* | 10/2002 | Horn et al. | 705/26 |
| 2002/0161641 A1* | 10/2002 | Quinlan et al. | 705/14 |
| 2002/0161667 A1* | 10/2002 | Felkey et al. | 705/26 |
| 2003/0065805 A1* | 4/2003 | Barnes, Jr. | 709/231 |
| 2003/0208522 A1* | 11/2003 | McDonnell et al. | 709/201 |
| 2004/0260609 A1* | 12/2004 | Loeb et al. | 705/14 |
| 2005/0075932 A1* | 4/2005 | Mankoff | 705/14 |
| 2006/0015904 A1* | 1/2006 | Marcus | 725/46 |

OTHER PUBLICATIONS

Scoring the Data Using Association Rules—Liu, Ma, Wong, Yu ; www.cs.uic.edu/~liub/publications/Scoring.pdf.*

A Review and Analysis of Commercial User Modeling Servers for . . . -Fink, KOBSA (2000); www.ics.uci.edu/%7Ekobsa/papers/2000-UMUAI-kobsa.pdf.*

The potential of Electronic Commerce in . . . -Terpsidis. . . (1997) ; agents.www.media.mit.edu/~moux/papers/emmsec97.ps.*

Data Mining for Direct Marketing: Problems and Solutions—Charles Ling And (1998) www.csd.uwo.ca/faculty/ling/papers/kdd98.ps.*

Scaling Up Agent Coordination Strategies—Te Gi Es ;ftp.eecs.umich.edu/people/durfee/computer01.pdf.*

Teamwork, Extended Enterprise and Electronic Commerce—Pigneur ; inforge.unil.ch/yp/Pub/97-ercim.pdf.*

A Distributed OLAP Infrastructure for E-Commerce—Chen, Dayal, Hsu (1999) www.hpl.hp.com/org/stl/dmsd/publications/coopis99.pdf.*

OLAP-based Scalable Profiling of Customer Behavior—Qiming Chen Umesh (1999) www.hpl.hp.com/org/stl/dmsd/publications/dawak_final.pdf.*

Development Milestones Towards a Tool for Working With Guidelines—Vanderdonckt (1999) belchi.qant.ucl.ac.be/publi/1999/Milestones.pdf.*

Efficient Search for Approximate Nearest Neighbor in . . . . -Kushilevitz . . . (1998) www.cs.technion.ac.il/~eyalk/KORnn.ps.Z.*

OLAP-based Scalable Profiling of Customer Behavior—Qiming Chen Umesh (1999) www.hpl.hp.com/org/stl/dmsd/publications/dawak_final.pdf.*

A Distributed OLAP Infrastructure for E-Commerce—Chen, Dayal, Hsu (1999) www.hpl.hp.com/org/stl/dmsd/publications/coopis99.pdf.*

Data mining and personalization technologies Yu, P.S.; Database Systems for Advanced Applications, 1999. Proceedings., 6th International Conference on Apr. 19-21, 1999 pp. 6-13.*

Intelligent Interactive Information Presentation—For Cultural Tourism peach.itc.it/papers/i3pCultureTour.pdf.*

Shopping Models: A Flexible Architecture for Information Commerce—Ketchpel (1996) dblab.kaist.ac.kr/~redstone/DL/postscript/DOC141.ps.*

ADAM/DDD-an application-specific database design tool for dynamic distributed decision-making Demurjian, S.A.; Hu, M.Y.; Kleinman, D.L.; Song, A.; Systems, Man, and Cybernetics, 1991. 'Decision Aiding for Complex Systems, Conference Proceedings., 1991 IEEE International Conference on Oct. 13-16, 1991 pp. 2079-2084 vol. 3.*

Multilevel database security using information clouding Shenoi, S.; Fuzzy Systems, 1993., Second IEEE International Conference on Mar. 28-Apr. 1, 1993 pp. 483-488 vol. 1.*

Sumner, I. "Web Site Novelties Can Bring PR Opportunities", Marketing, pp. 31, Jun. 17, 1999 Haymarket Business Publications.

Kumar, M. et al. "Sales Promotions on the Internet" Proceedings of the 3rd USENIX Workshop on Electronic Commerce, pp. 167-176, Published: Berkeley, CA, 1998.

Nelson, K. "Marketing Meets Automation to Increase Sales", Business Marketing, vol. 83, No. 9 pp. 47, Sep. 1998.

* cited by examiner

FIG. 2

| Promotion Number | Qualifying Value | Reward Value | Dates Start | Dates Stop | Counter | Pointer | |
|---|---|---|---|---|---|---|---|
| 1 | QV1 | RV1 | S1 | P1 | C1 | PR1 | —142A |
| 2 | QV2 | RV2 | S2 | P2 | C2 | PR2 | —142B |
|  |  |  |  |  |  |  |  |
| M | QVM | RVM | SM | PM | CM | PRM | —142M |

METHOD FOR CONVENIENTLY ENABLING A WEB SERVER TO PROVIDE COMMERCIAL PROMOTIONS USING COMPILED CODE

FIELD OF THE INVENTION

The present invention relates generally to electronic commerce, and more particularly to commercial promotions provided by an electronic-commerce web server using compiled code.

BACKGROUND

Commercial promotions are tools often used by merchants to boost sales, such as coupons that offer discounts for future purchases, discounts on current purchases in response to excess inventory, shipping upgrades or shipping charge reductions tied to particular circumstances of credit card use, and so forth. Such promotions have understandably become an important aspect of modem electronic commerce.

Nevertheless, today's web server technology provides two ways of implementing commercial promotions, neither of which is entirely satisfactory. The first way is to encode the details of each promotion into the web server's compiled code. This enables a promotion to execute quickly on the web server, and therefore provides the advantage of not diminishing the responsiveness experienced by customers who use the web server. Unfortunately, specialized technical skill is required—the skill of a computer programmer—to add each new promotion, to end each promotion, or to change the terms of any current promotion. This reliance on specialized technical skill adds to the expense of offering promotions, and may also limit a merchant's agility when the need arises to change promotions in response to shifting market conditions.

The second way of implementing a promotion is to use a business-rules engine that manages promotions on behalf of the web server. A business-rules engine reduces the need for special technical skill to add or to change promotions, as a business-rules engine greatly simplifies the programming task. Unfortunately, the use of a business rules engine significantly diminishes the web server's responsiveness, because the rules that define promotions must be interpreted at each runtime rather than compiled beforehand and executed.

Because of these shortcomings of today's technology, there is a need for a new way of enabling a web server to provide commercial promotions, wherein the server remains responsive to customers and yet becomes efficient and agile when the need arises to add, change, or end a promotion.

SUMMARY OF THE INVENTION

In response to the aforementioned need, the present invention provides an agile and efficient way for a merchant to add, change, and end a commercial promotion offered over an electronic commerce web server without diminishing the server's responsiveness to customers.

The present invention includes a set of modules of compiled code that reside within the web server's larger compiled code. The modules are executed selectively to provide the promotions. The invention also includes a database for storing the terms of the promotions and for storing information used to identify which of the modules should be selected and executed to provide each of the promotions.

Entries in the database include the terms of the promotions—a promotion is created and defined by entering its terms into the database. The terms of a promotion may include a qualifying value, a reward value, and start and stop dates that specify when the promotion is active. For example, a qualifying value may be a product category, a product number or stock keeping unit (SKU), a product price or an order's total of product prices, and so forth. A reward value may be, for example, a price discount, an N-for-M offer such as a two-for-the-price-of one offer, a coupon to be applied to future purchases, a shipping upgrade, an offer of free shipping or expedited handling, a product rebate, frequent flyer miles, a token or a substantial gift of appreciation, and so forth.

Within the database, the promotions are associated with the modules of selectively executable compiled code. The association may be made explicitly by a pointer that is part of the database record that includes the terms of the promotion, or the association may be implicit based on other aspects of the terms of the promotion. For example, there may be a module that provides discounts and is therefore associated with the promotions that have discount reward values, another module that provides shipping upgrades and is therefore associated with the promotions that have shipping-upgrade reward values, and yet another module that provides token gifts of appreciation and is therefore associated with the promotions that have token-gift reward values.

Further, the database may contain reward-value parameters that are passed to the modules. For example, a promotion whose terms include a token-gift reward value module may also include a reward-value parameter entry such as "travel clock" that specifies the nature of the token gift.

As the server processes a commercial transaction, it looks for a qualifying value that might match a qualifying value of one of the promotions in the database. When a matching promotion is found in the database, a determination is made as to whether the matching promotion is active. This may be done by comparing the date of the transaction with start and stop dates of the matching promotion. When the matching promotion is determined to be active, the matching promotion's reward value is determined, and the associated module of selectively executable compiled code is executed.

To add, change, or end a promotion, the merchant writes terms of a new promotion into the database or edits terms of an existing promotion. For example, the merchant may change the reward value associated with the qualifying value "use of an in-house credit card" from "five percent discount" to "100 frequent flier miles" simply by editing the database rather than by writing new code for the web server. Thus, the present invention provides the merchant with a convenient way of adding, ending, and changing promotions, by interacting with the database rather than with the web server's code, and yet offers the performance advantages that come with using compiled web-server code. These and other aspects of the present invention will be more fully appreciated when considered in light of the following drawings and detailed description.

BRIEF DESCRIPTION OF THE DRAWINGS

FIG. 2 shows an exemplary arrangement of records in the database of FIG. 1.

DETAILED DESCRIPTION OF THE INVENTION

Figure 1:
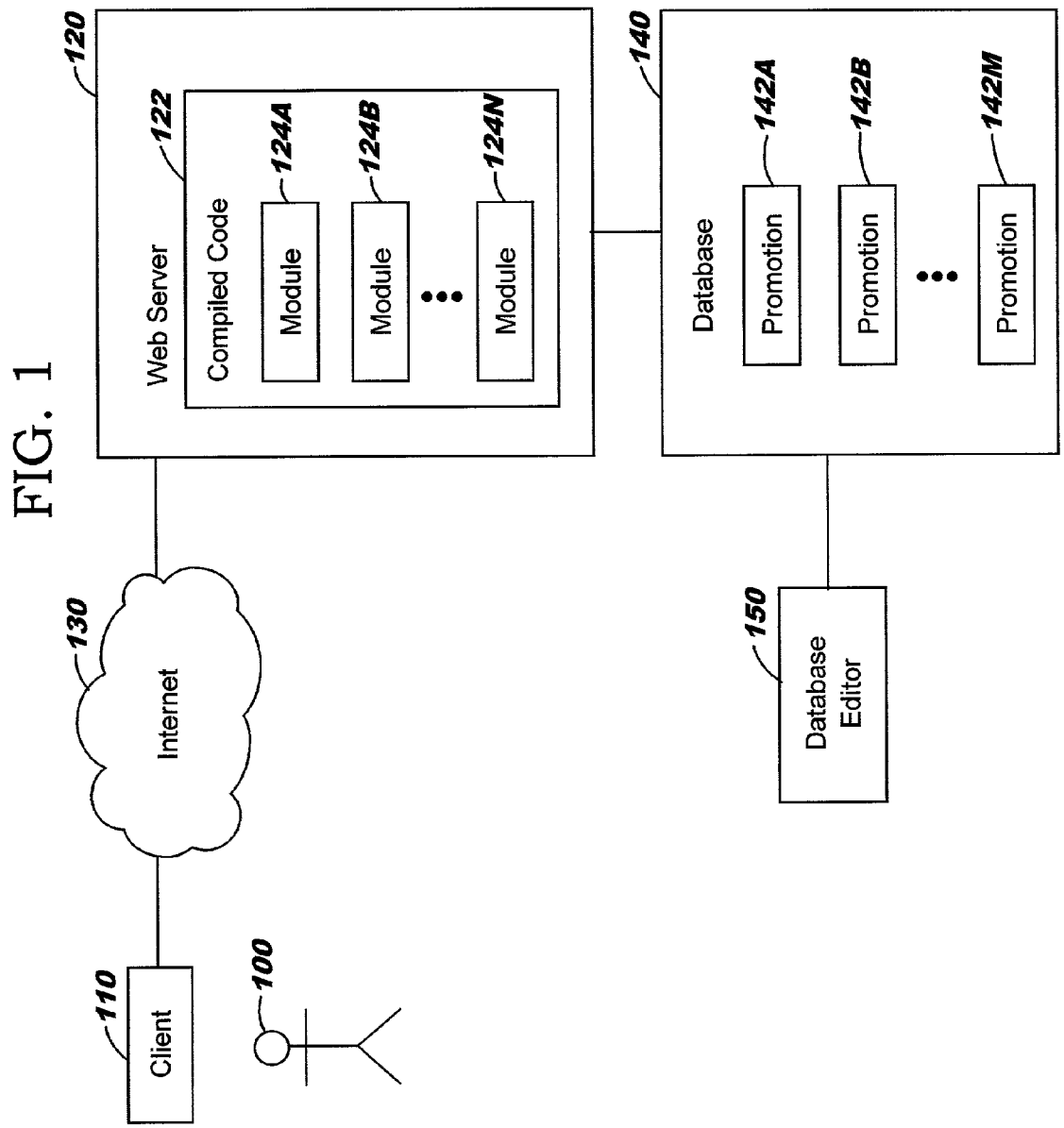
FIG. 1 is a block diagram that shows aspects of a structure and environment of the invention including an electronic commerce web server and a database.

As shown in FIG. 1, a customer 100 uses a client 110 such as a personal computer with a web browser to access an electronic commerce web server 120 over the Internet 130 or over another communication provider. The customer 100 engages the server 120 in commercial transactions, for example placing purchase or rental orders, enquiring on the status of orders, browsing or searching catalogs, and so forth.

Responsive to these transactions, the server 120 may provide commercial promotions. Promotions are tools often used by merchants to boost sales, such as coupons that offer discounts for future purchases, discounts on current purchases in response to excess inventory, shipping upgrades or shipping charge reductions tied to particular circumstances of credit card use, and so forth.

To provide promotions, the present invention includes modules of selectively executable compiled web server code 124A through 124N, where N is at least one. The modules 124A through 124N reside within the server's larger body of compiled code 122. To provide a particular promotion, a particular module of the modules 124A through 124N is selected and executed.

The invention also includes a database 140 for storing terms of the promotions 142A through 142M, where M is at least one, and for storing information used to identify which of the modules 124A through 124N should be selected and executed to provide each of the promotions 142A through 142M. Although FIG. 2 shows the database 140 as separate from the web server 120, the database 140 and the web server 120 may be combined. A user such as a merchant edits the database 140 using a database editor 150, which may be included within a platform that runs the database 140, or which may be a separate device such as a personal computer or other workstation.

A promotion is created and defined by entering its terms into the database as a database record. As shown in FIG. 2, records in the database 140 include the terms of the promotions 142A through 142M. The terms of the promotions 142A through 142M may include qualifying values 143, reward values 144, and start and stop dates 145 that specify when the promotions are active. For example, a qualifying value 143 may be a product category, a product number or stock keeping unit (SKU), a product price or an order's total of product prices, and so forth. A reward value 144 may be, for example, a price discount, an N-for-M offer such as a two-for-the-price-of one offer, a coupon to be applied to future purchases, a shipping upgrade, an offer of free shipping or expedited handling, a product rebate, frequent flyer miles, a token or a substantial gift of appreciation, and so forth. The database records may also include promotion counters 146 that are advanced as the associated promotions are provided. The promotion counters 146 help a merchant, for example, to track the use of each of the promotions for which a promotion counter 146 is included.

The terms of the promotions 142A through 142M are associated with the modules of selectively executable compiled code 124A through 124N. Associations may be made explicitly by pointers 147 that may be included in the terms of the promotions 142A through 142M, or associations may be implicit, based on other aspects of the terms of the promotions 142A through 142M such as the reward values 140. For example, there may be a module that provides discounts and is therefore associated with the promotions that have discount reward values, another module that provides shipping upgrades and is therefore associated with the promotions that have shipping-upgrade reward values, and yet another module that provides token gifts of appreciation and is therefore associated with the promotions that have token-gift reward values. In the case of implicit association, the reward value may in effect serve as a pointer to the associated module.

Further, the database 140 may contain reward-value parameters (not shown) that are passed to the modules. For example, a promotion whose terms include a token-gift reward value module may also include a reward-value parameter entry such as "travel clock" that specifies the nature of the token gift.

Figure 3:
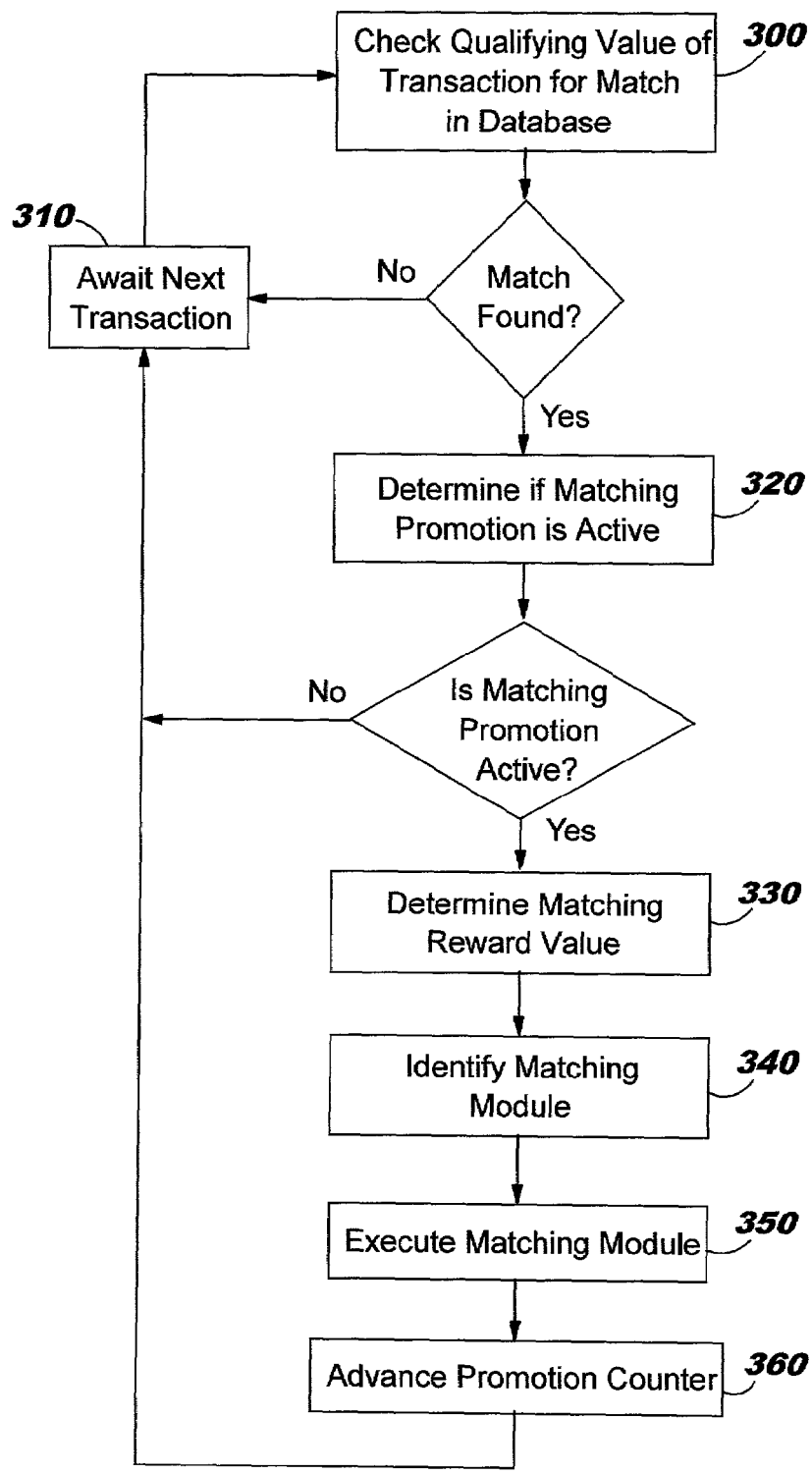
FIG. 3 is a flowchart showing aspects of the operation of the web server and database of FIG. 1.

FIG. 3 shows aspects of the operation of the server 120 and database 140. As the server 120 processes a commercial transaction, it looks for a qualifying value that might match a qualifying value 143 included in the terms of one of the promotions 142A through 142M present in the database 140 (step 300). When a match is not found, the server 120 awaits the next transaction (step 310).

Otherwise (i.e., a matching qualifying value 143 is found in the database 140), a determination is made as to whether the promotion with the matching qualifying value 143, called here the matching promotion, is active. This may be done by comparing the date of the commercial transaction with the start and stop dates 145 of the matching promotion (step 320). If the matching promotion is not active, the server awaits the next transaction (step 310).

Otherwise (i.e., the matching promotion is active) the reward value 144 of the matching promotion is found (step 330); this is called here the matching reward value. The module of selectively executable compiled code 124A through 124N associated with the matching reward value, which module is called here the matching module, is identified either explicitly or implicitly as described earlier (step 340), the matching module is executed (step 350) thereby providing the promotion, and the associated promotion counter 146 is advanced (step 360). The web server 120 then awaits the arrival of the next transaction (step 310).

To add, change, or end a promotion, a merchant writes terms of a new promotion into the database or edits terms of an existing promotion 142A through 142M, using the database editor 150. For example, the merchant may change the reward value 144 associated with the qualifying value 142 "use of an in-house credit card" from reward value 144 "five percent discount" to reward value 144 "one-hundred frequent flier miles" simply by editing the database 140 rather than by writing new code for the web server 120.

From the foregoing description, those skilled in the art will recognize that the present invention provides the merchant with a convenient way of adding, ending, and changing promotions, by interacting with the database 120 through the database editor 150 rather than with the code of the web server 120, and yet offers the performance advantages that come with using compiled web-server code. The foregoing description is illustrative rather than limiting, however, and the scope of the present invention is limited only by the following claims.

We claim:

1. A method for enabling a web server to provide a commercial promotion, comprising the acts of:
  detecting a qualifying value of a commercial transaction;
  checking a database of promotions for presence of a promotion that includes the qualifying value; and when a promotion that includes the qualifying value is present in the database, associating the qualifying value of the promotion with a module of selectively executable compiled web server code residing on a server's body of compiled code, selecting the module of selectively executable compiled web server code and executing the module of selectively executable compiled web server code that provides the promotion, wherein the associating is made explicitly by pointers that are included in terms of the promotions.

2. A method for enabling a web server to provide a commercial promotion, comprising the acts of:

detecting a qualifying value of a commercial transaction;

checking a database of promotions for presence of a promotion that includes the qualifying value;

when a promotion that includes the qualifying value is present in the database, determining a reward value of the promotion that includes the qualifying value based on associating a module of selectively executable compiled web server code residing on a server's body of compiled code made explicitly by pointers that are included in terms of the promotion; and executing the module of selectively executable compiled web server code associated with the reward.

3. The method of claim 2, wherein the module is associated with the reward value by a pointer of the pointers.

4. The method of claim 3, wherein the pointer is in the database.

5. The method of claim 2, further including the act of advancing a promotion counter in response to executing the module.

6. The method of claim 2, wherein the database stores terms of the promotion and information identifying the module of selectively executable compiled web server code, and wherein the method further comprises:

creating and defining the promotion by entering the terms of the promotion into the database; and adding, ending or changing of the promotion by interacting with the database through a database editor.

7. A method for enabling a web server to provide a commercial promotion, comprising the acts of:

detecting a qualifying value of a commercial transaction;

checking a database of promotions for presence of a promotion that includes the qualifying value;

when a promotion that includes the qualifying value is present in the database, determining whether the promotion that includes the qualifying value is active; and when the promotion that includes the qualifying value is active, determining a reward value of the promotion that includes the qualifying value and executing a module of selectively executable compiled code associated with the reward value.

8. The method of claim 7, wherein the act of determining whether the promotion that includes the qualifying value is active further includes the act of checking a start date.

9. The method of claim 7, wherein the act of determining whether the promotion that includes the qualifying value is active further includes the act of checking a stop date.

10. The method of claim 7, further including the act of advancing a promotion counter in response to executing the module.

11. The method of claim 7, wherein the database stores terms of the promotion and information identifying the module of selectively executable compiled code, and wherein the method further comprises:

creating and defining the promotion by entering the terms of the promotion into the database; and adding, ending or changing of the promotion by interacting with the database through a database editor.

12. Programmable media containing programmable software for enabling a web server to provide a commercial promotion, the programmable software comprising the steps of:

detecting a qualifying value of a commercial transaction;

checking a database of promotions for presence of a promotion that includes the qualifying value; and when a promotion that includes the qualifying value is present in the database, executing a module of selectively executable compiled web server code that provides the promotion.

13. The programmable media containing programmable software of claim 12, wherein the programmable software enables one of adding, ending and changing of the promotion by interacting with the database through a database editor.

14. Programmable media containing programmable software for enabling a web server to provide a commercial promotion, the programmable software comprising the steps of:

detecting a qualifying value of a commercial transaction;

checking a database of promotions for presence of a promotion that includes the qualifying value;

when a promotion that includes the qualifying value is present in the database, determining a reward value of the promotion that includes the qualifying value; and executing a module of selectively executable compiled code associated with the reward value.

15. The programmable media containing programmable software of claim 14, wherein the module is associated with the reward value by a pointer.

16. The programmable media containing programmable software of claim 15, wherein the pointer is in the database.

17. The programmable media containing programmable software of claim 15, wherein the module is associated with the reward value implicitly.

18. The programmable media containing programmable software of claim 15, further including the act of advancing a promotion counter in response to executing the module.

19. Programmable media containing programmable software for enabling a web server to provide a commercial promotion, the programmable software comprising the steps of:

detecting a qualifying value of a commercial transaction;

checking a database of promotions for presence of a promotion that includes the qualifying value;

when a promotion that includes the qualifying value is present in the database, determining whether the promotion that includes the qualifying value is active; and when the promotion that includes the qualifying value is active, determining a reward value of the promotion that includes the qualifying value and executing a module of selectively executable compiled code associated with the reward value.

20. The programmable media containing programmable software of claim 19, wherein the act of determining whether the promotion that includes the qualifying value is active further includes the act of checking a start date.

21. The programmable media containing programmable software of claim 19, wherein the act of determining whether the promotion that includes the qualifying value is active further includes the act of checking a stop date.

22. The programmable media containing programmable software of claim 19, further including the act of advancing a promotion counter in response to executing the module.

* * * * *